UNITED STATES PATENT OFFICE.

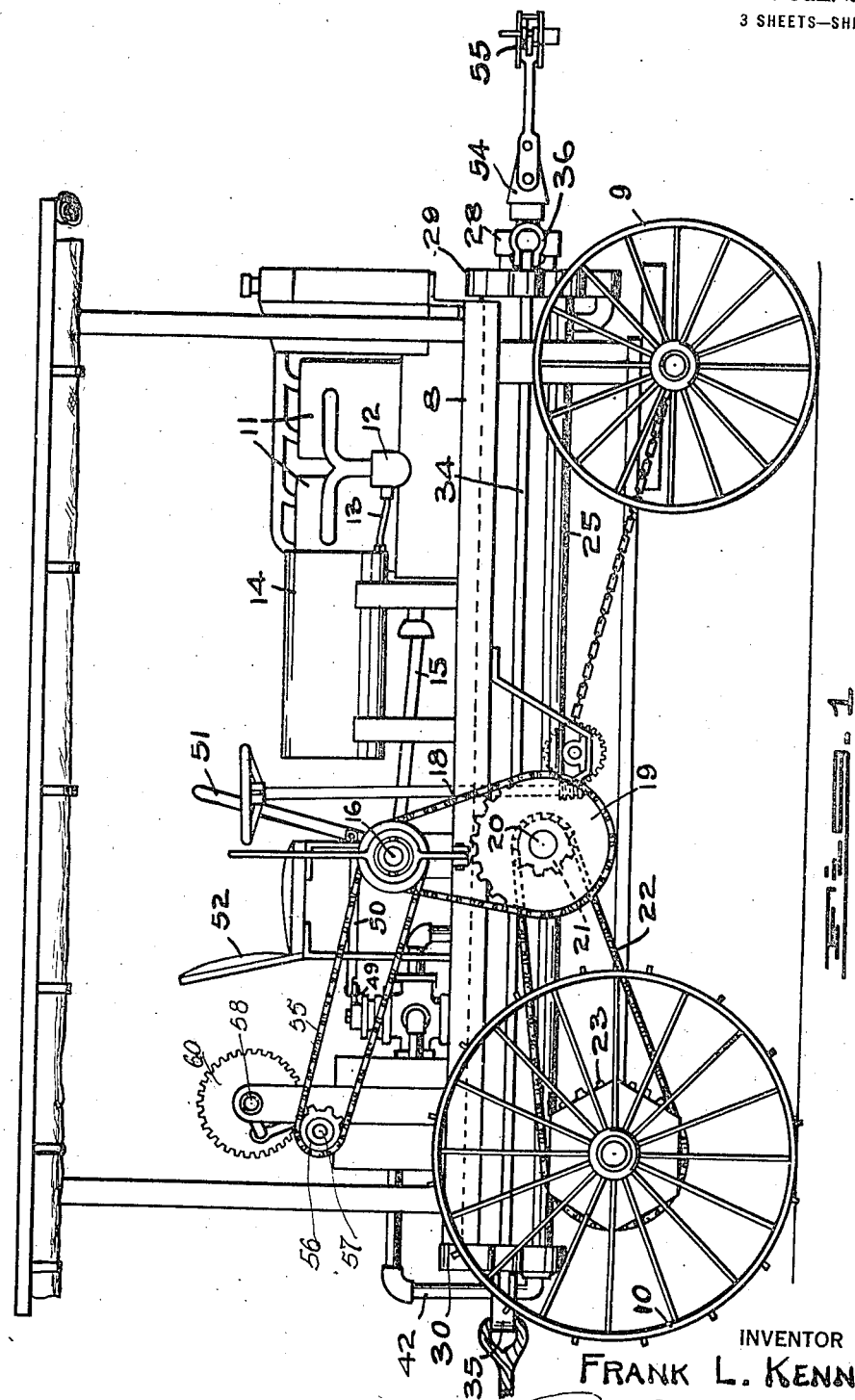

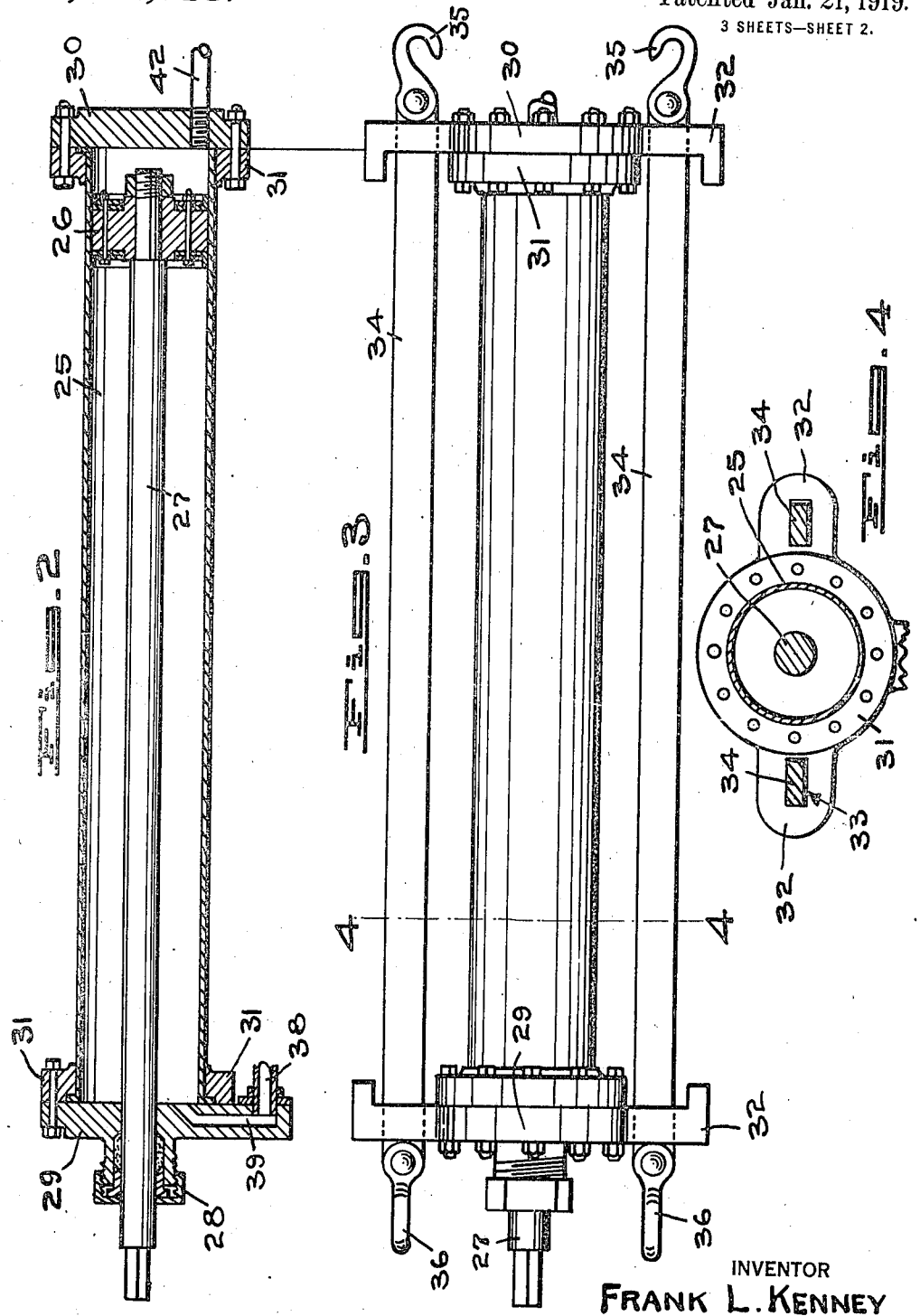

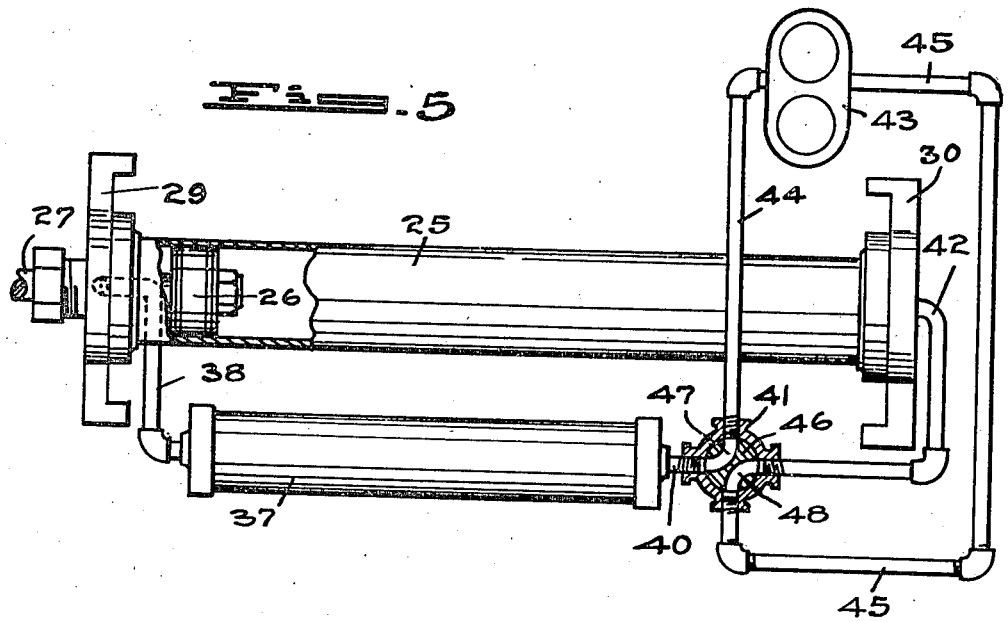
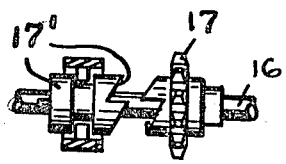

FRANK L. KENNEY, OF PORTLAND, OREGON, ASSIGNOR OF ONE-HALF TO FRANK A. SWEENEY AND ONE-HALF TO FRANK E. KENNEY, BOTH OF PORTLAND, OREGON.

STUMP-EXTRACTING MACHINERY.

1,291,918. Specification of Letters Patent. Patented Jan. 21, 1919.

Application filed January 18, 1918. Serial No. 212,522.

*To all whom it may concern:*

Be it known that I, FRANK L. KENNEY, a citizen of the United States, residing at Portland, in the county of Multnomah and State of Oregon, have invented a new and useful Improvement in Stump-Extracting Machinery, of which the following is a specification.

This invention relates to improvements in stump extracting machinery, and the object of this improvement is to provide strong and simple hydraulic mechanism that may be mounted on a tractor frame and that may be utilized both for pulling and splitting stumps.

A further object is to provide anchoring mechanism for the machine that is connected with the cylinder heads, so that the pressure of fluid against the cylinder heads will be substantially balanced by the tension of the anchoring mechanism.

The invention consists in the novel construction of a hydraulic device for developing power, and in the adaptation and combination of such device with a tractor frame and with means for anchoring the same, as will be more clearly hereinafter described and claimed.

In the accompanying drawings, Figure 1 is a view in side elevation of a stump extracting device constructed in accordance with this invention; Fig. 2 is a sectional view of a hydraulic cylinder that is embodied in the device; Fig. 3 is a detached plan view of the hydraulic cylinder; Fig. 4 is a sectional view on broken line 4—4 of Fig. 3; Fig. 5 is a conventional view illustrating the hydraulic cylinder in connection with a four way valve and a pump; and Fig. 6 is a fragmentary view in elevation of a detail of the invention.

Referring to the drawings, throughout which like reference numerals indicate like parts, the numeral 8 indicates the frame of a stump extractor that is mounted on front and rear tractor wheels 9 and 10 respectively, whereby it may easily be moved from place to place.

Mounted upon the tractor frame is an engine 11 provided with a carbureter 12 that is connected by a pipe 13 with a fuel tank 14.

The engine is connected by a driving shaft 15 with a transverse shaft 16 located just in front of the rear wheels of the engine. Each end of the shaft 16 is connected by sprocket wheel 17 and chain 18 with a sprocket wheel 19 on a shaft 20 and each end of the shaft 20 is connected by sprocket wheel 21 and chain 22 with another sprocket wheel 23 that is secured to one of the rear tractor wheels 10 whereby the engine may be driven. The driving mechanism just described is of course in duplicate on the two sides of the machine.

The sprocket wheels 17 are loosely mounted on the shaft 16 and are adapted to be engaged by a clutch 17' that is splined onto the shaft 16 when it is desired to move the machine.

Extending lengthwise of the tractor frame midway between the wheels is a hydraulic cylinder 25, see Figs. 2 and 3, within which is disposed a piston 26 that is secured to a piston rod 27 that projects outwardly through a packing gland 28 in the front wall or head 29 of the cylinder.

The rear end of the cylinder 25 is provided with a head 30 similar to the head 29. The heads 29 and 30 are securely bolted to flange members 31 that are fastened to the ends of the cylinder 25.

The heads 29 and 30 are each provided on opposite sides with extensions 32, as more clearly shown in Fig. 4, that are provided with slots 33 through which tension bars 34 may pass. The tension bars are each provided on the rear end with a hook 35 and on the front end with a ring 36, the hooks and rings being constructed and secured to the bars in such manner that when a pull is exerted on the hooks the rings will be caused to engage with the outer side of the forward head 29, and when a pull is exerted on the rings the hooks will be caused to engage with the outer side of the head 30.

37 is a compensating chamber of tubular form that is disposed side by side in parallel relation to the cylinder 25 and is connected at its front end by a pipe 38 and passageway 39 with the interior of the cylinder and at its rear end by a pipe 40 with a four way valve 41.

The valve 41 is connected with the rear end of the cylinder 25 by a pipe 42 and is connected with a pump 43 by a pipe 44 through which liquid may be forced from the pump through the valve. The valve 41 is also connected with a pipe 45 that leads to the pump or to a suitable reservoir from which the pump gets its liquid by suction.

The connections of the pipes 40, 42, 44 and 45 with the casing of the valve 41 are arranged at four equidistant points around the valve and the interior of the valve is provided with a valve member 46 having two passageways 47 and 48 by which different pipes that are connected with the valve may be successively connected.

The top of the valve member 46 above the casing is provided with a fixed arm 49 that is connected by a link 50 with a lever 51 that is accessible from the seat 52 upon which the operator sits.

When the device is in use liquid, as oil, may be pumped into either end of the cylinder to move the piston in either direction. When the piston is in the position shown in Fig. 5 and it is desired to exert a pull on the piston rod 27 the valve member 46 is turned so that the passageway 47 will connect the pipes 40 and 44 and the passageway 48 will connect the pipes 42 and 45, thereby permitting liquid to be drawn from the rear end of the cylinder through pipe 42, valve passageway 48 and pipe 45 and to be pumped under a high pressure into the forward end of the cylinder through pipe 44, passageway 47, pipe 40, compensating chamber 37, pipe 38 and passageway 39.

When the piston is to be moved from the position shown in Fig. 2 to the position shown in Fig. 5, the valve member 46 is turned so that communication for the return of liquid from the forward end of the cylinder to the pump is established through the pipes 40 and 45 and communication for the inlet of liquid under pressure from the pump to the rear end of the cylinder is established through the pipes 44 and 42.

It will be seen that when the piston rod is within the cylinder, as shown in Fig. 2, it will occupy a portion of the space therein and that less oil will be required to move the piston from front to rear end of the cylinder than will be required to move such piston from rear to front end thereof. This difference in the volume of oil required for the different movements is compensated for by the chamber 37.

The forward end of the piston rod is provided with a wedge 54 that may be used for splitting stumps and with a cable gripping device 55 that may be removably secured to the wedge and is adapted to grip a cable when the device is used for pulling.

The pump may be of any standard make that is adapted to secure a high pressure in the cylinder 25 and such pump may be driven from the shaft 16 by a chain 55 that passes over a sprocket wheel 56 on a shaft 57, the shaft 57 being geared to the crank shaft 58 of the pump by a pinion, not shown, that meshes with a gearwheel 60 on the crank shaft 58. The sprocket wheel on the shaft 16 over which the chain that drives the pump passes may be arranged in the same manner and provided with a clutch of the form shown in Fig. 6 so that it may be disconnected.

The tension bars 33 are of great importance since they serve to relieve the bolts that hold the heads 29 and 30 of a great amount of strain and serve as devices by which the cylinder may be directly anchored to a fixed support when the machine is in use, thereby eliminating the strain on the frame.

If the device is used for pulling the same may be anchored by cables or chains that are secured to the hooks 35 and consequently the enormous pressure of the liquid between the head 29 and the piston 26 will be sustained by the tension bars by reason of the rings 36 engaging with the outer side of the head. The tendency of the liquid to blow out the head will thereby be eliminated.

If the device is used for exerting a forward pressure, as for splitting stumps, the anchor cables will be fastened to the rings 36 and the rear head will be sustained in a similar manner by the engagement of the hooks 35 therewith.

It is obvious that changes in the precise form and arrangement of the various parts of this device may be resorted to within the scope of the following claims.

What I claim, and desire to protect by Letters Patent, is:

1. A stump puller comprising a hydraulic cylinder having a head in each end and tension bars extending lengthwise of said cylinder and adapted to engage each of said heads said tension bars being adapted for the reception of anchor lines whereby internal pressure against either of said heads will be balanced by the tension of said bars.

2. A stump puller comprising a hydraulic cylinder having a head in each end thereof each of said heads having slotted extensions on each side thereof, tension bars extending lengthwise of said cylinder and passing through said slots, the ends of said tension bars adapted to be connected with anchor lines and means on the ends of said tension bars for engaging with the outer sides of said heads.

3. A stump puller comprising a frame mounted on tractor wheels, a hydraulic cylinder disposed on said frame and carried thereby, a head in each end of said cylinder, means connected with each of said heads and extending to a point near the opposite end of said cylinder and adapted to be connected with anchor lines, a piston in said cylinder, a piston rod connected with said piston and means for introducing fluid under pressure to said cylinder.

4. A stump puller comprising a hydraulic cylinder having a head in each end thereof, tension bars extending lengthwise of said cylinder and adapted to be connected with anchor lines, means on said tension bars for engaging said heads, a piston in said cylinder, a piston rod on said piston, a pump, conduit means connecting said pump with each end of said cylinder, a four way valve interposed in said conduit means and a return conduit pipe from said valve to said pump.

5. A stump puller comprising a hydraulic cylinder, a piston disposed therein, a piston rod on said piston and projecting out of one end of said cylinder, a compensating chamber connected with one end of said cylinder, a four way valve connected with said compensating chamber, a conduit connecting said valve with the other end of said cylinder, a pump, conduit means connecting said pump and said valve whereby liquid may be selectively pumped from one end of said cylinder to the opposite end thereof.

Signed by me at Portland, Oregon, this 27" day of December, 1917.

FRANK L. KENNEY.

Witnesses:
A. W. DAVIS,
S. W. ROGERS.